Dec. 1, 1942.   F. H. ROBY ET AL   2,303,500
WELDER CONTROL
Filed Aug. 2, 1940   4 Sheets-Sheet 1

INVENTORS.
Frank H. Roby,
Ernest G. Anger.
BY
ATTORNEY

INVENTORS.
Frank H. Roby,
Ernest G. Anger.
BY
ATTORNEY

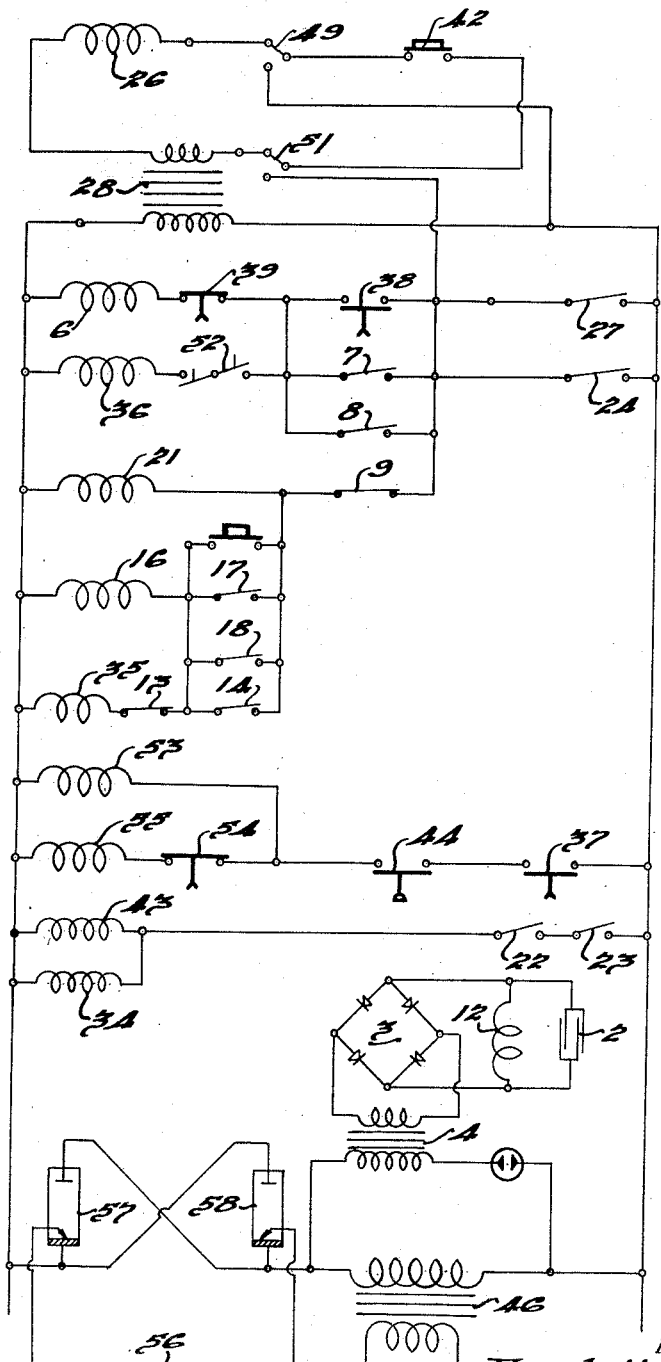

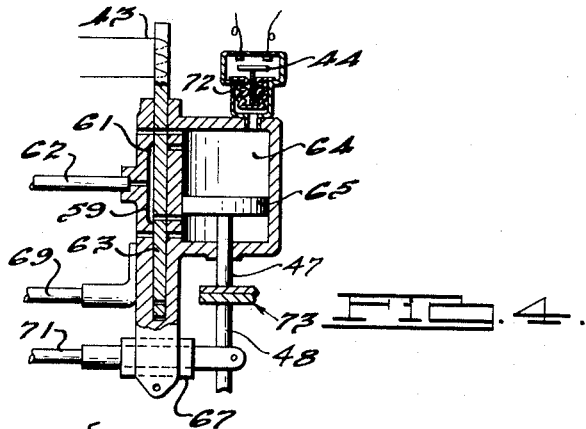

Patented Dec. 1, 1942

2,303,500

UNITED STATES PATENT OFFICE 2,303,500

WELDER CONTROL

Frank H. Roby, Milwaukee, and Ernest G. Anger, Wauwatosa, Wis., assignors to Square D Company, Detroit, Mich., a corporation of Michigan Application August 2, 1940, Serial No. 350,028

13 Claims. (Cl. 219—4)

This invention relates to electric welder control systems, more particularly to a system adapted for the control of the welding current through electronic tubes such as ignitron tubes.

One object of the invention is to provide such a system which will insure proper functioning when the system is operating under a heat control which utilizes the passage of current through a portion only of the normal half cycle of the supply current.

Another object of the invention is to provide such a system which will function properly under adverse operating conditions, such as would be represented by the failure of one of the ignitron electronic tubes to fire.

Another object of the invention is to provide such a system in which the "hold" period in the welding cycle is initiated at the end of the welding period, regardless of the time setting of the electronic tubes.

Other objects and features of the invention will be readily apparent to those skilled in the art from the specification and appended drawings illustrating certain preferred embodiments in which:

Figure 3 is a schematic wiring diagram of the system.

Figure 4 is a diagrammatic view of a simple welding machine to which the system may be applied.

Figures 5 and 6 are graphs showing the voltage and current relationships when full power and reduced power heat control are used.

Figure 7 is a graph indicating the time constant of a condenser element in the system.

Figure 1:
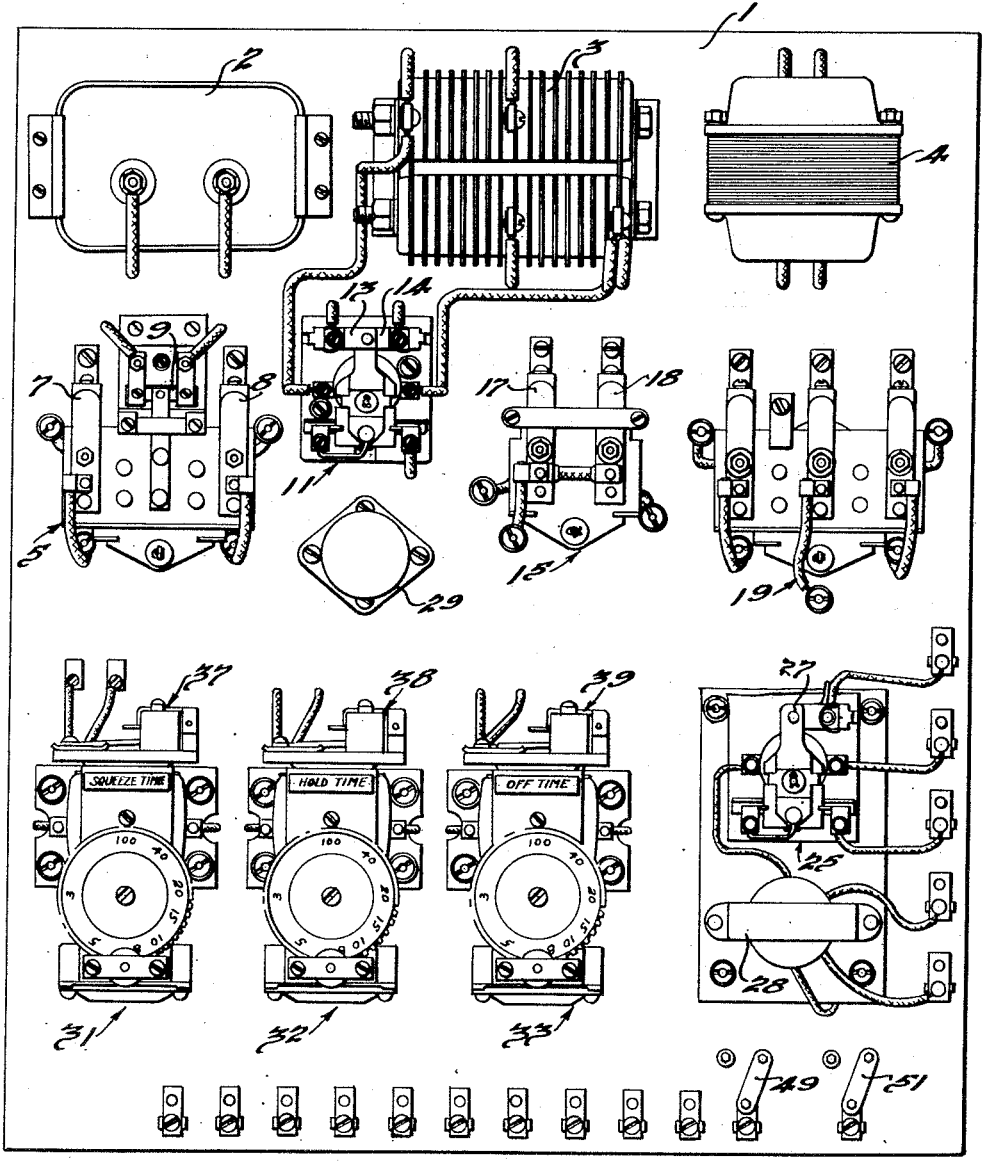
Figure 1 is a front elevational view of a panel incorporating certain of the elements of the system according to the present invention.
Figure 2:
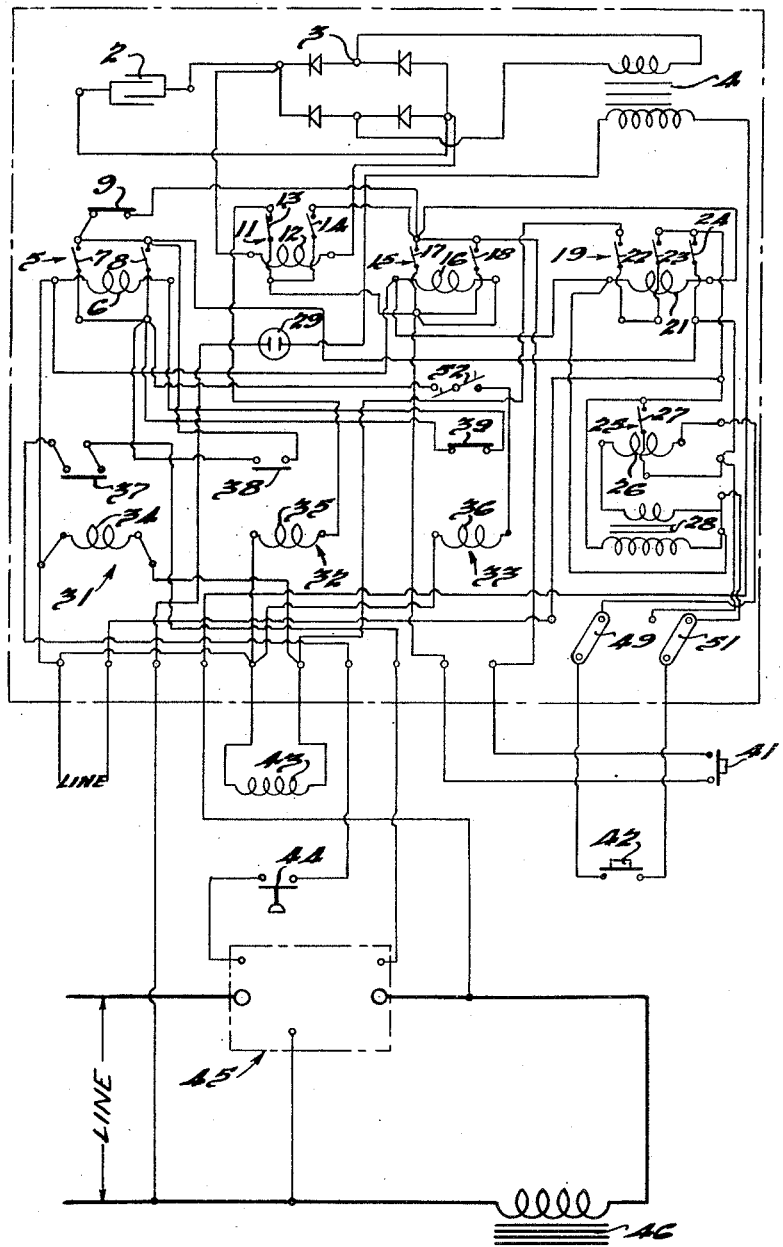
Figure 2 is a wiring diagram of the panel and of additional elements in the system associated therewith.

The panel illustrated in Figures 1 and 2 comprises an insulating mounting board 1 on which are disposed a condenser 2, a dry disc copper oxide rectifier 3, and a transformer 4. A plurality of relays are provided including a relay 5 having an operating coil 6, normally open contacts 7 and 8, and normally closed contact 9. Another relay indicated at 11 has an operating coil 12, and single pole double throw contacts including the normally closed contact 13 and normally open contact 14. Another relay on the panel is indicated at 15 and includes an operating coil 16 and normally open contacts 17 and 18. A further relay 19 having an operating coil 21 includes three normally open contacts, 22, 23, and 24. Also mounted on the panel is a single pole normally open relay 25 having an operating coil 26 and a contact 27, and immediately below this relay is disposed a low voltage control circuit transformer 28.

Also disposed on the panel is a neon tube 29 and three timing relays 31, 32 and 33 having operating coils 34, 35 and 36, the relays 31 and 32 having normally open contacts 37 and 38, and the relay 33 having normally closed contacts 39. The relays 31, 32, and 33 may be of any time delay construction, but as shown they follow, in general, the operating structure of the relay described and claimed in Patent 2,158,346 granted May 16, 1939, to Henry A. Wilhelm. The contact arrangement in the relays herein shown have been changed from the one shown in the Wilhelm patent, but this does not form any particular feature of the present invention, the operating mechanism being the same and being utilized to operate normally closed and normally open contacts.

In the wiring diagram, Figure 2, certain additional elements are diagrammatically shown. These include push buttons 41 and 42, the solenoid valve operating coil 43, the pressure switch contacts 44, the electronic tubes and control therefore, indicated generally as a unit at 45, a welder transformer 46, and welding electrodes 47 and 48. The panels further show the swingable links 49 and 51 in the circuit of push button 42. The wiring diagram of the panel of Figure 2 shows also a simple "on-off" switch 52 which may be of any desired construction.

In the schematic wiring diagram of Figure 3, the parts previously described are shown, and in addition, the elements of the electronic control 45 are schematically shown. These include a timing relay which may be similar to timing relays 31, 32, and 33, and which includes an operating coil 53 and normally closed contacts 54. There is also included the single pole normally open relay having an operating coil 55 and contacts 56 controlling the ignitor circuit of the electronic tubes shown at 57 and 58. These tubes are of well-known construction consisting of a mercury pool cathode and a crystal anode enclosed in an evacuated water cooled sheet metal jacket. These tubes are connected in parallel as shown and then act as a single pole device, since each tube conducts current in only one direction. An ignitor circuit is provided for each of the tubes which completes through the mercury pool cathode, creating a hot spot and causing the tube to become conductive. The ignitor circuit shown in Figure 3 is diagrammatically illustrated as controlled by the contacts 56 and this ignitor circuit has been simplified by the omission of the flow relay contacts, fuses and other incidental elements which might be commercially desirable.

Figure 4 shows diagrammatically a simple form of welding machine to which the present invention could be applied. This embodies a frame 59 having therein a valve inlet chamber 61 connected to a source of fluid pressure 62 and controlled by a solenoid valve 63 operated by the solenoid valve operating coil 43. The frame includes a cylinder 64 within which moves a piston 65 connected to a movable electrode 47. Supported in the frame 1 insulated therefrom by a bushing 67 is the stationary electrode 48. Power leads 69 and 71 are connected respectively to energize the electrodes 47 and 48. A pressure switch 72 is provided having the contacts 44 therein. The work to be welded is indicated at 73. In the position of the parts shown in Figure 4, a weld has been completed and the coil 43 deenergized to permit the valve 63 to move to its lowermost position. In this position, the fluid pressure supply 62 is connected, through the ports shown, with the underside of the piston 65 which is about to begin its upward movement to release the work from between the electrodes. When the coil 43 is energized, the valve slide 63 will be moved upwardly and will connect the supply 62 with that portion of the cylinder 64 above the piston 65, whereupon the piston will be moved downwardly to clamp the work to be welded between the electrodes. The pressure switch 72 is operated to close the contacts 44 when the pressure within the cylinder 64 above the piston 65 reaches a predetermined value to effect actuation of the pressure switch.

In the operation of the system so far described, closing of the push button 42 immediately energizes the operating coil 26 of relay 25 to effect closing of the contact 27. The closing of contact 27 completes the circuit through normally closed contact 9 of relay 5 to the operating coil 21 of relay 19 which closes to close its contacts 22, 23 and 24. The closing of contact 24 forms a maintaining circuit about contact 27 so that relay 19 will be maintained closed independent of the position of contact 27. The closing of contacts 22 and 23 energizes the solenoid valve operating coil 43 and the operating coil 34 of timing relay 31. The timing relay 31 determines the "squeeze" time in the welding cycle during which pressure is built up by the electrodes on the work to be welded. In the system as herein illustrated, a pressure switch has been provided and its contacts 44 placed in series with the contacts 37 of relay 31. In the operation of the system, either the pressure switch contacts 44 or the timing relay contacts 37 could be omitted. If the pressure switch only is used, the next operation would occur when sufficient pressure were built up on the electrodes. If the timing relay contacts alone were used, the next operation would occur after the lapse of a definite predetermined set time. In the system herein shown, where both are used, the next operation would occur when sufficient pressure is built up or when a certain time has elapsed, whichever period is the longer.

The closing of contacts 44 and 37 completes the circuit through the operating coil 53 of the electronic tube timing relay and also, through the normally closed contacts 54, energizes the operating coil 55 of the relay which effects closing of contact 56. This closes the ignitor circuit to the electronic tubes to energize the welding transformer primary and initiate the flow of welding current. Energization of the primary of the welding transformer also energizes the primary of the small transformer 4 which supplies power to the dry disc copper oxide rectifier 3. The output of the rectifier is connected to a parallel circuit consisting of the condenser 2 and the operating coil 12 of the relay 11. An explanation of this portion of the circuit will be given more in detail hereinafter. Relay 11 now closes to close contact 14 and to open contact 13. The closing of contact 14 energizes the operating coil 16 of relay 15 which closes its contacts 17 and 18 and thus forms a holding circuit to maintain itself energized.

When the contacts 54 of the electronic tube timing relay have been operated to open position, the relay operating coil 55 will be deenergized thus opening contacts 56 to deenergize the welding transformer primary and end the welding period. This will also deenergize the primary of transformer 4 and the operating coil 12 of relay 11 will be deenergized and the relay will open to open its contact 14 and close contact 13. Closing of contact 13 energizes the operating coil 35 of timing relay 32, thus initiating the "hold" time in the welding cycle. After an appropriate time delay determined by the setting of timing relay 32, its contacts 38 close to energize, through normally closed contact 39, the operating coil 6 of the relay 5 which closes to close its contacts 7 and 8 and open contact 9, the closing of contacts 7 and 8 forming a holding circuit around contact 38 whereby relay 5 maintains itself energized. The opening of contact 9 effects deenergization of the operating coils 21, 16 and 35 of relays 19 and 15 and timing relay 32 respectively. The opening of relay 19 opens contacts 22 and 23 to effect deenergization of the solenoid valve operating coil 43 and of the operating coil 34 of timing relay 31, thus preparing the system for recycling.

With the switch 52 in the position shown in Figure 3, non-repeat action of the welding system is obtained wherein only a single welding operation is carried out while the push button is maintained depressed. However, if the switch 52 is closed and the push button maintained closed, the closing of the relay 5 described above effects energization of the operating coil 36 of timing relay 33 and after a suitable interval corresponding to the "off" time in the welding cycle and determined by the setting of timing relay 33, the normally closed contact 39 will be operated to open position. The opening of contact 39 will deenergize the operating coil 6 of relay 5 which opens to open its contacts 7 and 8 and close the normally closed contact 9. The closing of contact 9 will then effect the energization of the operating coil 21 of the relay 19 and another welding cycle will be carried out as described above, this action being repeated so long as the push buttom is maintained closed.

In the operation of the welder control system herein described, the operating coil 12 of relay 11 must operate on a materially reduced root mean square current which is obtained when the heat control feature is utilized in the system and at the same time this relay must close under severe operating conditions represented by the failure of one of the two ignitron electronic tubes to fire, this latter circumstance providing the equivalent of a half wave rectification.

Figures 5 and 6 graph the voltage and current relationships which will exist under 100% and 20% currents at 25% power factor and 85% power factor respectively. It is seen, from these graphs, that the prevailing voltage peaks represented by the heavy lines at V are not materially reduced in either case. From this it is seen that although the current wave is materially reduced in area to secure the desired heat control, the voltage peak is still sharp enough to perform the desired function. Figure 5 illustrates the condition in which a 25% power factor load is being operated at 20% heating current or about 4% actual heat in the weld. The rather sharp voltage wave form indicated by the heavy line V is then applied to the rectifier 3 through the transformer 4. The condenser 2 connected in parallel with the operating coil 12 of relay 11 has an 0.04 cycle charging constant thereby building up to the full voltage peak within four hundredths of a cycle. The discharge time of the condenser is approximately one cycle as indicated in Figure 7. The long discharge time for the condenser 2 means that sufficient power is supplied to the operating coil 12 of the relay 11 to maintain the relay closed for nearly one cycle after it has once been closed. It is for this reason that the relay will remain closed although only one of the tubes 57, 58 is firing, and the sharp voltage peak indicated by the heavy line V on the graphs of Figures 5 and 6 causes the relay to close without hesitation, even though the actual root mean square current is materially reduced in the weld.

It is thus seen that the system herein disclosed provides for proper functioning even though the system is operating under a heat control using a materially reduced current through the weld and that the system will further function properly even though one of the ignitron electronic tubes should fail to fire. It is further seen that the system insures against opening of the electrodes while power is flowing and that it insures the starting of the hold period in the welding cycle at the end of the "weld" period, regardless of the time setting of the electronic controller so that no time in the cycle is lost in overlapping timing periods.

Push button 41 is utilized in the circuit to permit opening of the electrodes in the event that the electronic tubes should fail to fire. Once the electrodes are closed, the sequence panel is inactive until relay 11 is closed and again opened. If for any reason the tubes should fail to fire, the relay 11 does not become energized and, hence, it is ordinarily impossible to open the electrodes of the welding machine. Operation of the push button 41 permits the opening of the electrodes to remove the work in the event that the electronic tubes fail to fire.

While certain preferred embodiments of the invention have been specifically disclosed, it is understood that the invention is not limited thereto, as many variations will be readily apparent to those skilled in the art and the invention is to be given its broadest interpretation within the terms of the following claims.

What is claimed is:

1. In an electrical control device, a source of electric power having a discontinuous wave form, an electrical relay having an operating coil energized from said source, and an electrical condenser connected in parallel with said operating coil and having a discharge period greater than the discontinuous periods in the wave form of said source, said condenser discharge maintaining the operating coil energized during said discontinuous periods to provide for continuous operating coil energization regardless of the source wave form discontinuity.

2. In an electrical control device, a source of electric power which may assume a discontinuous wave form, an electrical relay having an operating coil energized from said source, and an electric condenser connected in parallel with said operating coil, said condenser having a discharge time greater than the periods of interruption in the electric power from said source, whereby said condenser will discharge through the coil in the interruption periods to maintain said relay energized continuously regardless of the source wave form discontinuity.

3. In an electrical control device, a source of electrical power which may assume a discontinuous wave form, a transformer having its primary energized from said source, an electrical relay having an operating coil energized from the secondary of said transformer, and an electrical condenser having a discharge period greater than the discontinuous periods which may occur in said source, said condenser being connected with said operating coil to maintain it energized through such discontinuous periods in the source wave form.

4. In an electrical control device, a source of electrical power which may assume a discontinuous wave form, a rectifying means having its input connected to said source, an electrical relay having an operating coil energized from the output of said rectifying means, and an electrical condenser connected in parallel with said operating coil, said condenser having a discharge period greater than the discontinuous period which may occur in said source, whereby said operating coil is maintained energized continuously regardless of the source wave form discontinuity.

5. In an electrical control device, a source of electrical power which may have a discontinuous wave form, a transformer having its primary energized from said source, the secondary of said transformer being connected to a rectifying means, an electrical relay having an operating coil energized by the output from said rectifying means, and an electrical condenser connected in parallel with said operating coil, said condenser having a discharge period greater than the discontinuous periods which may occur in said source, whereby the operating coil of said relay is maintained energized regardless of the discontinuations.

6. In a welder control system for electrically welding work by the passage of current between electrodes pressed against the work, a pair of electronic tubes controlling the flow of the welding current, said tubes being connected in parallel but in reverse polarity, means controlling the conductivity of said tubes to control the welding period, a control relay having an operating coil energized through said electronic tubes, and an electrical condenser connected in parallel with said operating coil, said condenser discharging through the operating coil during any periods in which discontinuations may occur in the current supplied through said tubes whereby the operating coil will remain continuously energized regardless of discontinuity in flow of current.

7. In a welder control system for electrically welding work by the passage of current between electrodes pressed against the work, a pair of electronic tubes controlling the flow of the welding current, said tubes being connected in parallel but in reverse polarity, means controlling the conductivity of said tubes to control the welding period, a control relay having an operating coil energized through said electronic tubes, and an electrical condenser connected in parallel with said operating coil, said condenser having a discharge period of not less than one-half cycle of the welding current supply and discharging through the operating coil during any periods in which said tubes are non-conductive whereby the operating coil will remain continuously energized regardless of discontinuations of the power supply through the tubes.

8. In a welder control system for electrically welding work by the passage of current between electrodes pressed against the work, a pair of electronic tubes controlling the flow of the welding current, said tubes being connected in parallel but in reverse polarity, means controlling the conductivity of said tubes to control the welding period, a control relay having an operating coil energized through said electronic tubes, and an electrical condenser connected in parallel with said operating coil, said condenser having a discharge period of substantially one cycle of the welding current supply and discharging through the operating coil during any periods in which said tubes are non-conductive whereby the operating coil will remain continuously energized regardless of discontinuations of the power supply through the tubes.

9. In a welder control system for electrically welding work by passing current therethrough between electrodes pressed thereagainst, means controlling the flow of the welding current, means controlling the operation of said first mentioned means to control the welding period, a control relay having an operating coil energized through said first mentioned means, and an electrical condenser connected in parallel with said operating coil, said condenser having a discharge period of at least one half cycle of the welding current supply and discharging through the operating coil during any periods in which said first mentioned means is non-conductive whereby said operating coil will remain continuously energized regardless of discontinuations of conductivity in said first mentioned means.

10. In a welder control system for electrically welding work by the passage of current between electrodes pressed against the work, a pair of electronic tubes controlling the flow of welding current, said tubes being connected in parallel but in reverse polarity, means controlling the conductivity of said tubes to control the welding period, a control relay having an operating coil energized through said electronic tubes, and means for insuring that said operating coil will be continuously energized when desired even though discontinuations may occur in the current supplied through said tubes.

11. In a welder control system for electrically welding work by the passage of current between electrodes pressed against the work, a pair of electronic tubes controlling the flow of welding current, said tubes being connected in parallel but in reverse polarity, means controlling the conductivity of said tubes to control the welding period, a control relay having an operating coil energized through said electronic tubes, and means for insuring that said relay will remain closed even though discontinuations may occur in the current supplied through said tubes.

12. In a welder control system for electrically welding work by the passage of current between electrodes pressed against the work, a pair of electronic tubes controlling the flow of welding current, said tubes being connected in parallel but in reverse polarity, means controlling the conductivity of said tubes to control the welding period, rectifying means having its input energized through said electronic tubes, a control relay having an operating coil energized from the output of said rectifying means, and an electrical condenser connected in parallel to said operating coil and discharging through the operating coil during any periods in which said tubes are non-conductive whereby the operating coil will remain continuously energized regardless of discontinuations of the power supply through the tubes.

13. In a welder control system for electrically welding work by the passage of current between electrodes pressed against the work, a pair of electronic tubes controlling the flow of welding current, said tubes being connected in parallel but in reverse polarity, means controlling the conductivity of said tubes to control the welding period, a transformer having its primary energized through said tubes, rectifying means having an input connected to the secondary of said transformer, a control relay having an operating coil energized from the output of said rectifying means, and an electrical condenser connected in parallel with said operating coil and discharging through the operating coil during any periods in which said tubes are non-conductive whereby the operating coil will remain continuously energized regardless of discontinuations of the power supply through the tubes.

FRANK H. ROBY.
ERNEST G. ANGER.